United States Patent Office 2,776,843
Patented Jan. 8, 1957

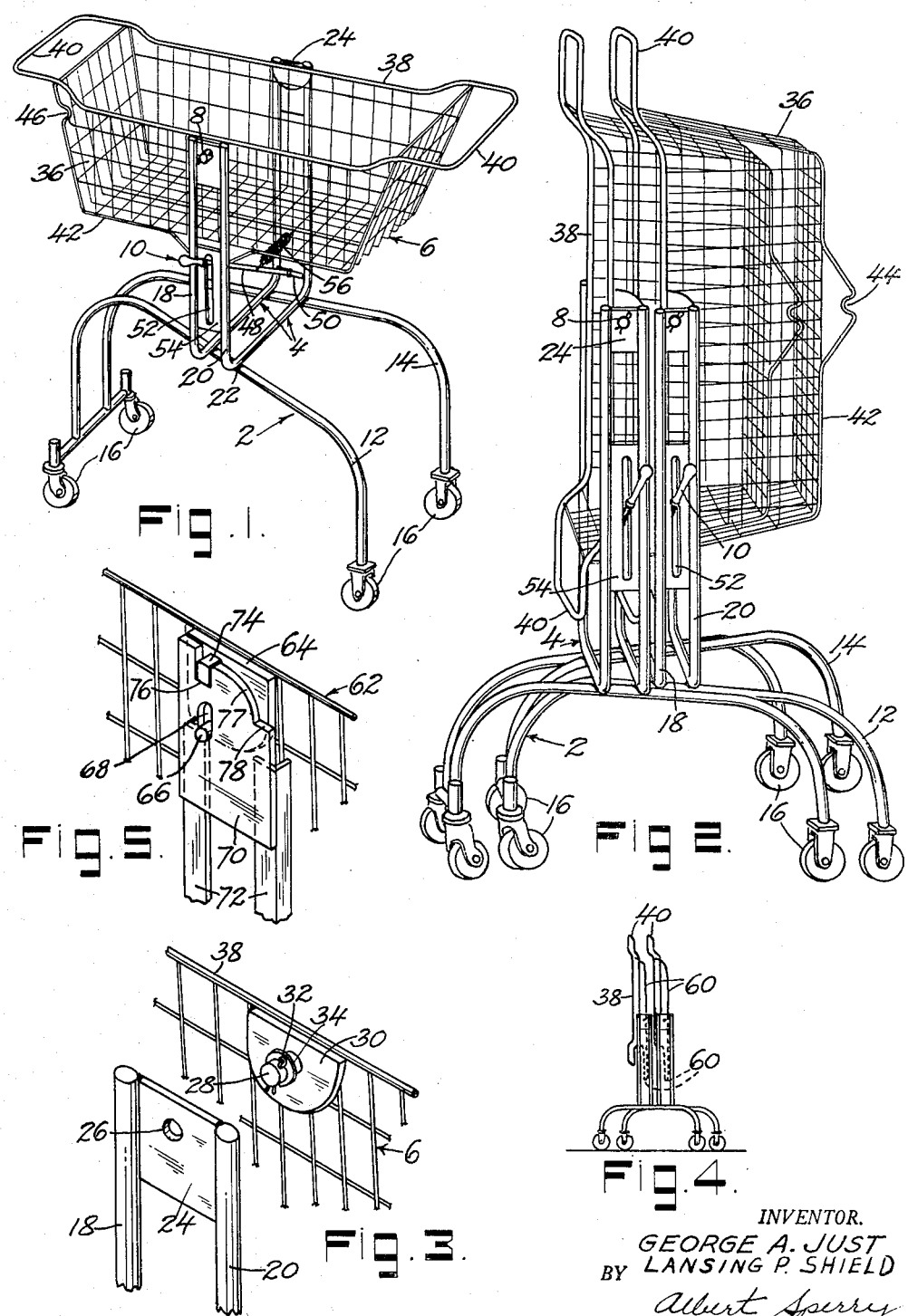

2,776,843

NESTING SHOPPING CART

George A. Just, Scarsdale, N. Y., and Lansing P. Shield, Saddle River, N. J., assignors to The Grand Union Company, East Paterson, N. J., a corporation of Delaware Application May 7, 1953, Serial No. 353,531

5 Claims. (Cl. 280—33.99)

This invention relates to wheeled market baskets or carriers of the type used in self service stores to enable customers to select and gather together the articles they wish to purchase so they may be brought to a checking station for packaging and payment.

The carriers take up a great deal of space near the entrance of the store in which they are used and they frequently are so jumbled together that it is difficult for customers and clerks to find a passage about the carriers. Some carriers are constructed with a tapered basket having a movable rear end to allow one basket to be pushed into another for nesting together. However, in such constructions, the basket projects forward from a vertical support at the rear of the wheeled base and in order to prevent tilting of the cart when loaded, the base and support must necessarily be of heavy construction. Furthermore, even when fully nested, each carrier generally takes up from 6 to 10 inches of space and when the tapered baskets are pushed together to save space, they often become so jammed or interlocked that it is difficult to pull them apart.

In accordance with the present invention these and other objections to wheeled carriers of the prior art are overcome and constructions are provided which are relatively light in weight and stable in construction and which may be nested into a space of only about 2 to 4 inches and without jamming or interlocking of the baskets.

These advantages are preferably attained by supporting the baskets for tilting movement on a support whereby the baskets will be arranged in vertical positions when the carriers are nested. The support for the basket preferably is located near the center of the wheeled base and, threfore, the desired stability is provided without using the heavy and bulky supports heretofore required.

One of the objects of the present invention is to reduce the weight and cost of wheeled carriers for use in self service stores while permitting nesting of the carriers in a space saving arrangement.

Another object of the invention is to provide an improved type of wheeled carrier wherein the basket of the carrier is tiltable to a vertical position in nesting the carriers together.

A further object of the invention is to provide wheeled carriers for self service stores which may be nested together in a limited space without jamming or interlocking of the baskets thereon.

These and other objects and features of the present invention will appear from the following description thereof in which reference is made to the figures of the accompanying drawing wherein typical embodiments of the invention are shown for purposes of indicating the nature of the invention and preferred forms thereof.

In the drawings:

Fig. 1 is a perspective showing a preferred type of wheeled carrier embodying the present invention;

Fig. 2 illustrates a pair of the carriers shown in Fig. 1 arranged in nested relation;

Fig. 3 illustrates a detail of construction of the carrier of Figs. 1 and 2;

Fig. 4 is a diagrammatic illustration of an alternative form of the present invention; and Fig. 5 illustrates a further detail of construction of the carrier of Figs. 1 and 2.

In that form of the invention chosen for purposes of illustration in Figs. 1, 2, and 3, the carrier embodies a wheeled base 2 having basket supports 4 extending upward at opposite sides of a wire basket 6. The basket is mounted for tilting movement about the pivot points 8 adjacent the upper ends of the supports 4. When in use, the basket 6 is held in a horizontal position by suitable means such as the locking member 10 whereas it is tiltable to a vertical position for nesting with other baskets and carriers as shown in Fig. 2.

The base is preferably formed of light weight aluminum tubing and has two side members 12 and 14 which are turned downward at their opposite ends to receive wheeled casters 16. The side members are arranged in converging relation so that the base is somewhat narrower at the front than at the rear whereby the base of one carrier will be capable of nesting within the base of another. The basket supports 4 are formed of parallel U-shaped tubular members 18 and 20 which are secured at their base to the side members 12 and 14 as indicated at 22 so as to hold the side members and basket supports rigidly together providing a strong light weight assembly.

The adjacent upper ends of the U-shaped members 18 and 20 are secured together by plates 24 which are each provided with a circular opening 26 therein for receiving the pivot pins 28 mounted on plates 30 secured to the basket 6 at opposite sides thereof. The pivot pins may be held in place to support the baskets for tilting movement on the supports by means of the cotter pins 32 which extend through suitable holes in the projecting ends of the pivot pins. Washers 34 may be located between the cotter pins 32 and the plates 24 if desired.

The basket 6 is preferably formed of wire or the like and may be rectangular in form with inwardly sloping sides 36. A heavy wire frame or tubular member 38 extends along the upper sides of the basket and projects beyond the basket at one or both ends to form a handle 40 for pushing and steering the carrier as it is moved about from place to place by the customer. A further heavy wire member 42 is located adjacent the bottom of the basket on one side thereof and slopes downward below the bottom to a return bend 44 which provides a recess for receiving the locking member 10 to hold the basket in its horizontal position of Fig. 1 for normal use. The same or another heavy wire extends upward near one end of the basket and is similarly formed with a return bend 46 serving as a locking recess for receiving the locking member 10 to hold the basket in the tilted nesting position of Fig. 2.

The locking member shown in the drawings consists of a bar 48 pivotally mounted on a pin 50 extending between the U-shaped members 18 and 20 adjacent the base of the carrier on one side thereof. The free end of the locking bar projects through a slot 52 in a plate 54 secured to the upright portions of the members 18 and 20 on the opposite side of the carriage. Spring 56 is connected to the locking bar and urges its free end upward so that it will engage the locking recess 44 when the basket is in a horizontal position and prevent the basket from tilting about its pivots even when loaded unevenly. The free end of the locking bar projects a short distance beyond the plate 54 and uprights 18 and 20 so that it may be pressed downward to disengage the recess 44 after the basket has been emptied. The basket may then be tilted to the upright position of Fig. 2 whereupon the free end of the locking bar will engage the locking recess 46 to hold the basket in vertical position.

The pivot pins 28 on the basket are preferably located off center, that is, a little nearer the rear of the basket than the front so that when released for tilting movement the basket will automatically tip forward. Thereafter, when one carrier is pushed up toward the rear of another the narrower front end of the base enters between the side members at the wider rear end of the other carrier. The handle of the tilted basket then engages the basket support or basket of the other carrier and tilts further into its upright locking position. The baskets can then nest fully and the rear carrier can be pushed all the way up until the upright 18 of the rear carrier engages the upright 20 of the carrier in front. The space occupied by each carrier is thus limited to the distance between the uprights of the U-shaped basket support which need be only 3 or 4 inches. At the same time, the baskets themselves are spaced sufficiently to prevent jamming or interlocking of the wires thereof so that the carriers are freely separable for use by the customers.

When a carrier is separated from others for use, the locking bar is depressed and the basket tilted to horizontal position. The locking bar then rides up the inclined sides of the wire member 42 until it snaps into the locking recess 44. The basket is then securely held in horizontal position and may be loaded as heavily and unevenly as desired without danger of accidental tilting. However, when unloaded, the operating bar need only be depressed again to disengage the locking recess 44 and allow the basket to tilt for nesting with other carriers until required for use by another customer.

It will be apparent that various types of locking mechanism may be employed for holding the basket in horizontal and vertical positions. Thus, as illustrated in Fig. 5, the basket 62 may be provided with a side plate 64 carrying a hinge pin 66 which is received within the vertically extending elongated slot 68 in a mounting plate 70. The mounting plate is secured to the upper ends of the uprights 72 of the carrier which, as shown, are formed of angle iron members. The side plate 64 on the basket is provided with a locking pin 74 arranged to extend into the retaining recess 76 in the mounting plate 70 when the basket 62 is in a horizontal position. However, the basket may be tilted from a horizontal position to a vertical nesting position by raising the basket bodily until the locking pin 74 is lifted out of the locking recess 76. During this lifting movement the hinge pin 66 is raised within the elongated slot 68 and the basket may then be turned to a vertical position. As the basket is tilted, the locking pin 74 travels over the arcuate surface 77 of the mounting plate 70 until it engages the shoulder 78 on the mounting plate. The basket is then held in the desired vertical nesting position. Thereafter, when it is desired to use the carrier, the basket may be tilted freely to a horizontal position whereupon the locking pin 74 will enter the locking recess 76 and the basket as a whole together with its pivot pin will drop downward into the full line position of Fig. 5 to hold the basket securely in its normal horizontal carrying position.

While the basket is preferably formed of heavy wire as described, it may be formed of flexible netting, fabric or other material. The carriers will then nest as shown diagrammatically in Fig. 4 wherein the base and basket support fit together as shown in greater detail in Fig. 2 while the netting of the basket drops and folds downward as shown at 60 without necessarily presenting any actual nesting of the basket portion of the assembly at all.

The basket locking and releasing means used with either form of the invention may, of course, be varied in construction and the shape, style and construction of the base and basket support may also be changed considerably in design if desired. In view thereof it should be understood that the particular embodiments of the invention shown in the drawings and described above are intended to be illustrative only and are not intended to limit the scope of the invention.

We claim:

1. A wheeled carrier comprising a base, a basket support, and a basket, said base being of tapered form for nesting with the base of another carrier, said basket support extending upward at opposite sides of the basket, cooperating pivot means on the basket and support permitting tilting movement of the basket relative to said support, said basket support having a spring urged locking bar pivotally mounted thereon and normally urged upward adjacent one side of the basket, said basket being formed of wire and having a return bend portion thereof forming a locking recess engageable by said locking member when the basket is in a horizontal position for releasably holding said basket in said position.

2. A wheeled carrier comprising a base embodying a pair of tubular side members having the opposite ends thereof turned downwardly, casters secured to the downwardly turned ends of said side members, a pair of parallel U-shaped tubular basket supporting members secured at the lower portions thereof to the side members of the base substantially midway between the opposite ends thereof and holding said side members in relatively inclined relation for nesting with the base of another carrier, the opposite ends of said U-shaped members extending upward at opposite sides of the base and having basket pivoting means supported adjacent the upper ends thereof, a basket pivotally mounted on said basket pivoting means and having tapered sides for nesting with the basket of another similar carrier, the upper rim of said basket having a handle projecting outward therefrom for moving the carrier about and by which the basket when emptied may be moved with respect to said supporting members into and out of a horizontal nesting position, and means for releasably holding said basket in a horizontal position on said basket supporting members.

3. A wheeled carrier comprising a base embodying a pair of tubular side members having the opposite ends thereof turned downwardly, casters secured to the downwardly turned ends of said side members, a pair of parallel U-shaped tubular basket supporting members secured at the lower portions thereof to the side members of the base and holding said side members in relatively inclined relation for nesting with the base of another carrier, the opposite ends of said U-shaped members extending upward at opposite sides of the base and having basket pivoting means supported adjacent the upper ends thereof, a wire basket mounted for tilting movement on said basket pivoting means, one wire of said basket having a reverse bend therein forming a locking recess, and means on said basket supporting members releasably engageable with said locking recess to hold the basket in a horizontal position.

4. A wheeled carrier comprising a base embodying a pair of tubular side members having the opposite ends thereof turned downwardly, casters secured to the downwardly turned ends of said side members, a pair of parallel U-shaped tubular basket supporting members secured at the lower portions thereof to the side members of the base and holding said side members in relatively inclined relation for nesting with the base of another carrier, the opposite ends of said U-shaped members extending upward at opposite sides of the base and having basket pivoting means supported adjacent the upper ends thereof, a wire basket mounted for tilting movement on said basket supporting members, a locking bar pivotally mounted on the basket supporting members at one side of the carrier and extending between the basket supporting members at the opposite side of the carrier, a spring urging the free end of said locking bar upward toward the basket, said basket having the wire thereof formed with a reverse bend presenting a locking recess positioned to receive the locking bar for holding said basket in a horizontal carrying position and formed with another reverse bend positioned to receive the locking bar to hold the basket in vertical nesting position.

5. A wheeled carrier comprising a base, a basket support and a basket, said base comprising a pair of side members spaced apart at one end of said base a distance greater than at the opposite end of the base, casters mounted at opposite ends of each of said side members, said basket support comprising a generally U-shaped member secured to said base substantially midway between the opposite ends of each of said side members and having portions extending upwardly at opposite sides of said basket, pivotal mounting means for said basket located adjacent the upper ends of said upwardly extending portions of said basket support, said basket being generally rectangular in shape and having tapered sides for nesting relation with a basket of another similar carrier, means located generally centrally on opposite sides of said basket and cooperating with said mounting means to provide substantially balanced support of the basket when loaded while permitting normal rotation of said basket when empty from a horizontal carrying position to a vertical nesting position, and cooperating means on said basket and basket support for locking said basket in each of said positions.

References Cited in the file of this patent

UNITED STATES PATENTS

| | | |
|---|---|---|
| 1,798,565 | Trullinger | Mar. 31, 1931 |
| 2,448,300 | Eaddy | Aug. 31, 1948 |
| 2,583,514 | Maslow | Jan. 22, 1952 |
| 2,605,116 | Alexander | July 29, 1952 |
| 2,689,132 | Kahn | Sept. 14, 1954 |